US010241193B2

(12) United States Patent
Wulff (10) Patent No.: US 10,241,193 B2
(45) Date of Patent: Mar. 26, 2019

(54) ARRANGEMENT FOR, AND METHOD OF, ACCURATELY LOCATING PRODUCTS IN A NOISY VENUE

(71) Applicant: SYMBOL TECHNOLOGIES, LLC, Lincolnshire, IL (US)

(72) Inventor: Thomas E. Wulff, Brookhaven, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 325 days.

(21) Appl. No.: 15/082,022

(22) Filed: Mar. 28, 2016

(65) Prior Publication Data

US 2017/0276768 A1 Sep. 28, 2017

(51) Int. Cl.
| | |
|---|---|
| *G01S 5/18* | (2006.01) |
| *G06K 7/10* | (2006.01) |
| *G06K 7/14* | (2006.01) |
| *G01S 1/74* | (2006.01) |
| *G01S 1/80* | (2006.01) |
| *G06Q 10/08* | (2012.01) |

(52) U.S. Cl.
CPC ................. *G01S 5/18* (2013.01); *G01S 1/74* (2013.01); *G01S 1/80* (2013.01); *G06K 7/10386* (2013.01); *G06K 7/1413* (2013.01); *G06Q 10/087* (2013.01); *G06K 2007/10524* (2013.01)

(58) Field of Classification Search
CPC .... G01S 5/18; G01S 1/80; G01S 1/74; G06K 7/10; G06K 7/14; G06K 7/10386; G06K 7/1413; G06K 2007/10524; G06Q 10/087
See application file for complete search history.

(56) References Cited

U.S. PATENT DOCUMENTS

| | | | |
|---|---|---|---|
| 6,678,209 B1 | 1/2004 | Peng et al. | |
| 2012/0214515 A1 | 8/2012 | Davis et al. | |
| 2016/0077192 A1 | 3/2016 | Calvarese et al. | |
| 2017/0236006 A1* | 8/2017 | Davis ................. | G06K 9/00671 |
| | | | 715/716 |

FOREIGN PATENT DOCUMENTS

| | | | | |
|---|---|---|---|---|
| WO | 2013/132393 A1 | 9/2013 | | |
| WO | WO-2013132393 A1 * | 9/2013 | ........... | G01S 5/0252 |

OTHER PUBLICATIONS

International Search Report and Written Opinion for corresponding International Patent Application No. PCT/US2017/014673 dated Apr. 7, 2017.

* cited by examiner

*Primary Examiner* — Isam A Alsomiri
*Assistant Examiner* — Amie M Ndure
(74) *Attorney, Agent, or Firm* — Yuri Astvatsaturov (57) ABSTRACT

Ultrasonic transmitters periodically transmit ultrasonic ranging signals, and an ultrasonic receiver receives the ultrasonic ranging signals on a mobile device in order to locate the mobile device in a venue. A controller determines a noise level in the venue, and varies a sound level of the periodically ranging signals based on the determined noise level, thereby optimizing the position of the mobile device.

19 Claims, 5 Drawing Sheets

ARRANGEMENT FOR, AND METHOD OF, ACCURATELY LOCATING PRODUCTS IN A NOISY VENUE

BACKGROUND OF THE INVENTION

The present disclosure relates generally to an arrangement for, and a method of, accurately locating products associated with data to be captured by a mobile device, such as a handheld, mobile reader, in a noisy venue, such as a retail store, a factory, a warehouse, a distribution center, a building, or a like controlled area.

It is known to deploy a real-time ultrasonic locationing system in an indoor venue, such as a retail store, a factory, a warehouse, a distribution center, a building, or a like controlled area, to locate and to track a mobile device, such as a handheld data capture reader, a smartphone, a tablet, a computer, a smartwatch, or a like electronic device. A known ultrasonic locationing system includes an ultrasonic transmitter subsystem having a plurality of ultrasonic transmitters mounted at fixed, known locations spaced apart in the venue, each ultrasonic transmitter being operative, in its turn, for periodically transmitting ultrasonic ranging signals, e.g., ultrasonic pulses in the 20-22 kHz frequency range, to an ultrasonic receiver subsystem having a microphone mounted on, and jointly movable with, the mobile device. The ultrasonic locationing system locates the position, and tracks the movement, of the mobile device and, in turn, of the products having data being captured in a read zone of the mobile device, along a tracking path within the venue, typically by using differential flight time techniques known in the art that incorporate triangulation, trilateration, multilateration, and like locationing techniques.

Under ideal operating conditions, each transmitter periodically transmits the ranging signals along direct paths to the microphone, which receives the ranging signals in a quiet environment in which there is little or no ambient noise. The flight time difference between the transmit time at which each ranging signal is transmitted and the receive time at which each ranging signal is received along each direct path, together with the known speed of each ranging signal, as well as with the known locations of the transmitters, are used, among other factors, to determine the distance along each direct path, and, in turn, the position of the microphone mounted on the mobile device, and, in turn, the location of the mobile device, as well as the location of products having data being captured in a read zone of the mobile device.

However, in practice, the operating conditions of the known ultrasonic locationing system are typically less than ideal. Aside from the ranging signals being directed along non-direct, folded paths due to reflections and/or scattering and/or absorption by walls, the ceiling, the floor, curtains, windows, shelves, equipment, and myriad other objects or persons, in the venue, the venue is usually not a quiet environment, and the ambient noise level can sometimes be high enough to degrade the signal-to-noise ratio of the ultrasonic ranging signals. A low signal-to-noise ratio can lead to an erroneous determination of the location of the microphone and of the mobile device that carries the microphone and, in turn, of the products whose data is being captured by the mobile device.

Accordingly, it would be desirable to more accurately locate and track a mobile device and of the products whose data is being captured by the mobile device in a noisy venue by an ultrasonic locationing system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for locating products in a noisy venue. The venue can be any indoor environment, such as a retail store, a factory, a warehouse, a distribution center, a building, or a like indoor controlled area. The arrangement includes a mobile device for capturing data associated with the products in the venue. For example, the mobile device can be a handheld, radio frequency (RF) identification (RFID) tag reader for reading RFID tags associated with the products, or a handheld, bar code symbol reader for reading bar code symbols associated with the products, or like data capture devices. The arrangement further includes a plurality of ultrasonic transmitters spaced apart of one another at fixed locations in the venue away from the mobile device. Preferably, the ultrasonic transmitters are mounted overhead above the mobile device. The arrangement still further includes a receiver, for example, a microphone, supported by, and jointly movable with, the mobile device in the venue.

The arrangement further comprises a controller, preferably a programmed microprocessor, for controlling the transmitters to transmit a plurality of ultrasonic ranging signals, preferably periodically, at a sound level, and for controlling the receiver to receive the ultrasonic ranging signals in order to determine a location of the mobile device and of the products in the venue. The controller controls the receiver to also receive acoustic noise signals, preferably periodically. The acoustic noise signals are indicative of noise in the venue. The noise can arise from a myriad of sound sources, such as people talking on phones or to each other, vehicles or equipment in operation, etc. The controller determines a noise level of the acoustic noise signals, and varies the sound level of the ranging signals based on the determined noise level to optimize the determined location of the mobile device and of the products in the venue. Advantageously, the controller increases the sound level of the ranging signals when the determined noise level exceeds a noise threshold, and decreases the sound level of the ranging signals when the determined noise level is below the noise threshold.

Another aspect of this disclosure relates to a method of locating products in a noisy venue. The method is performed by capturing data associated with the products in the venue by operating a mobile device, by spacing a plurality of ultrasonic transmitters apart of one another at fixed locations in the venue away from the mobile device, and by supporting a receiver on the mobile device for joint movement therewith in the venue. The method is further performed by controlling the transmitters to transmit a plurality of ultrasonic ranging signals at a sound level, by controlling the receiver to receive the ultrasonic ranging signals, by determining a location of the mobile device and of the products in the venue, by further controlling the receiver to also receive acoustic noise signals indicative of noise in the venue, by determining a noise level of the acoustic noise signals, and by varying the sound level of the ranging signals based on the determined noise level to optimize the determined location of the mobile device and of the products in the venue.

In accordance with this disclosure, the position or location of the mobile device and of the products whose data is being captured by the mobile device is more accurately determined, because, among other factors, the degrading effect of ambient noise, which is sometimes too loud, on the signal-to-noise ratio of the ultrasonic ranging signals is mitigated. For example, if the determined noise level is too high, i.e., exceeds a noise threshold or reference, then the controller increases the sound level of the ranging signals, thereby boosting the signal-to-noise ratio.

Figure 1:
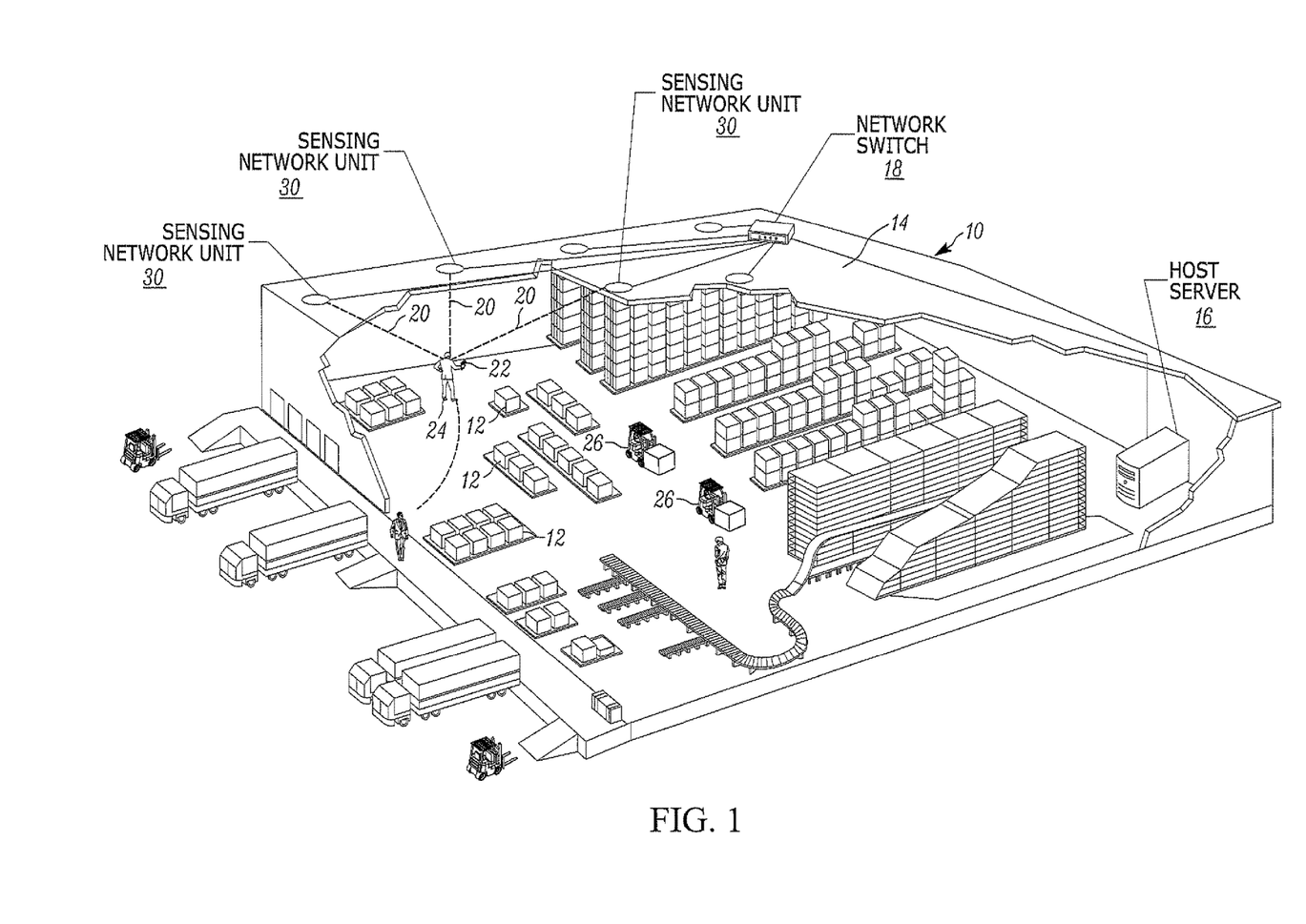
FIG. 1 is a broken-away, perspective view, as seen from above, of an arrangement for accurately locating a mobile device and of the products whose data is being captured by the mobile device in a noisy venue, such as a warehouse, in which multiple, overhead, sensing network units are deployed in accordance with the present disclosure.

Turning now to the drawings, reference numeral 10 in FIG. 1 generally depicts a warehouse environment or venue in which products 12, shown in FIG. 1 as cuboid cartons for simplicity, are to be accurately located in accordance with this disclosure. As described below, a plurality of sensing network units 30 is mounted overhead, for example, on or below a ceiling 14. Advantageously, the sensing network units 30 can be installed every twenty to eighty feet or so in a square grid. A network computer or host server 16, typically locally located in a backroom at the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 controls each sensing network unit 30.

Figure 2:
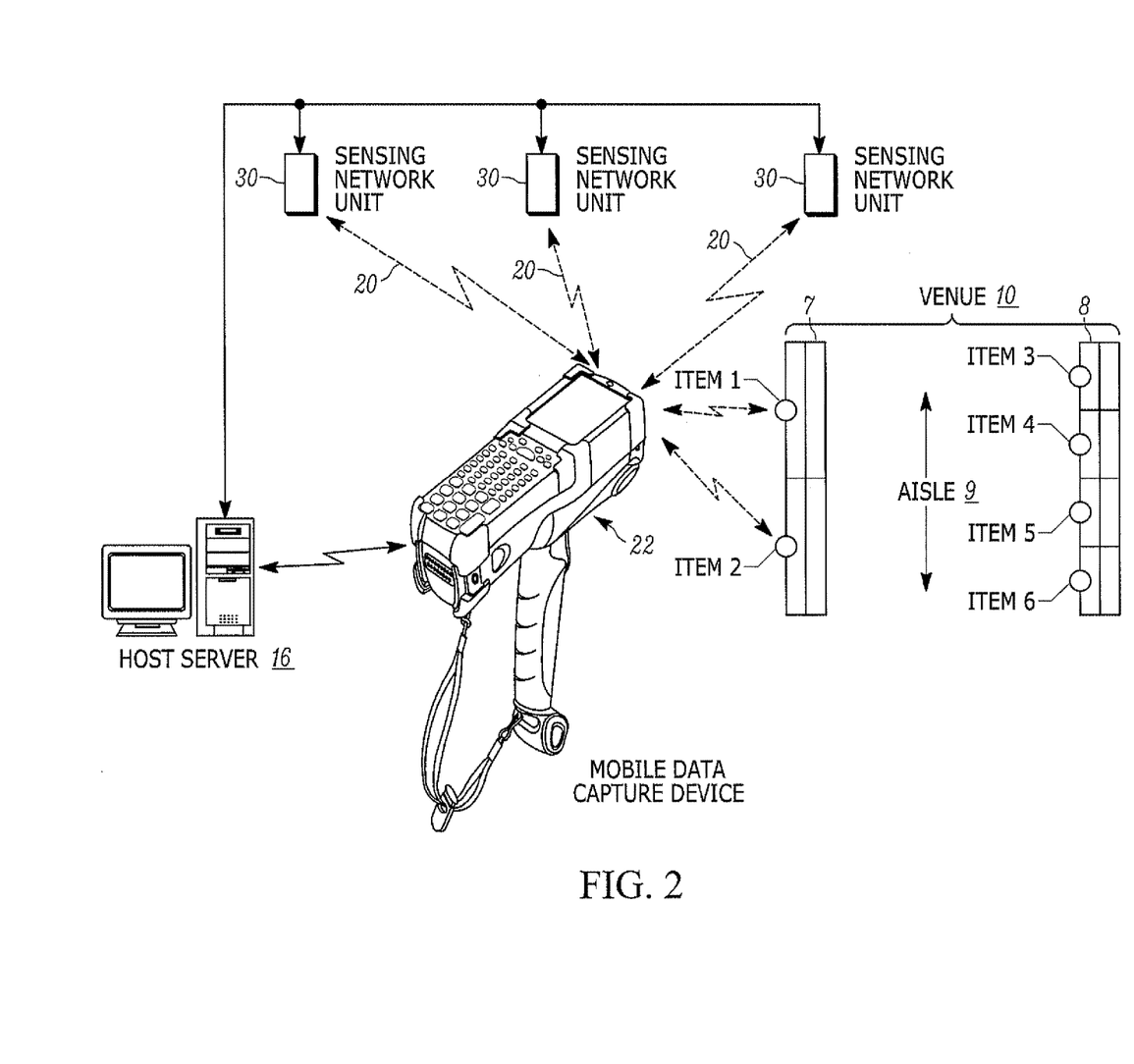
FIG. 2 is a simplified diagram of an arrangement of the general type shown in FIG. 1, as operated to locate the mobile device by triangulation in the noisy venue in accordance with the present disclosure.
Figure 3:
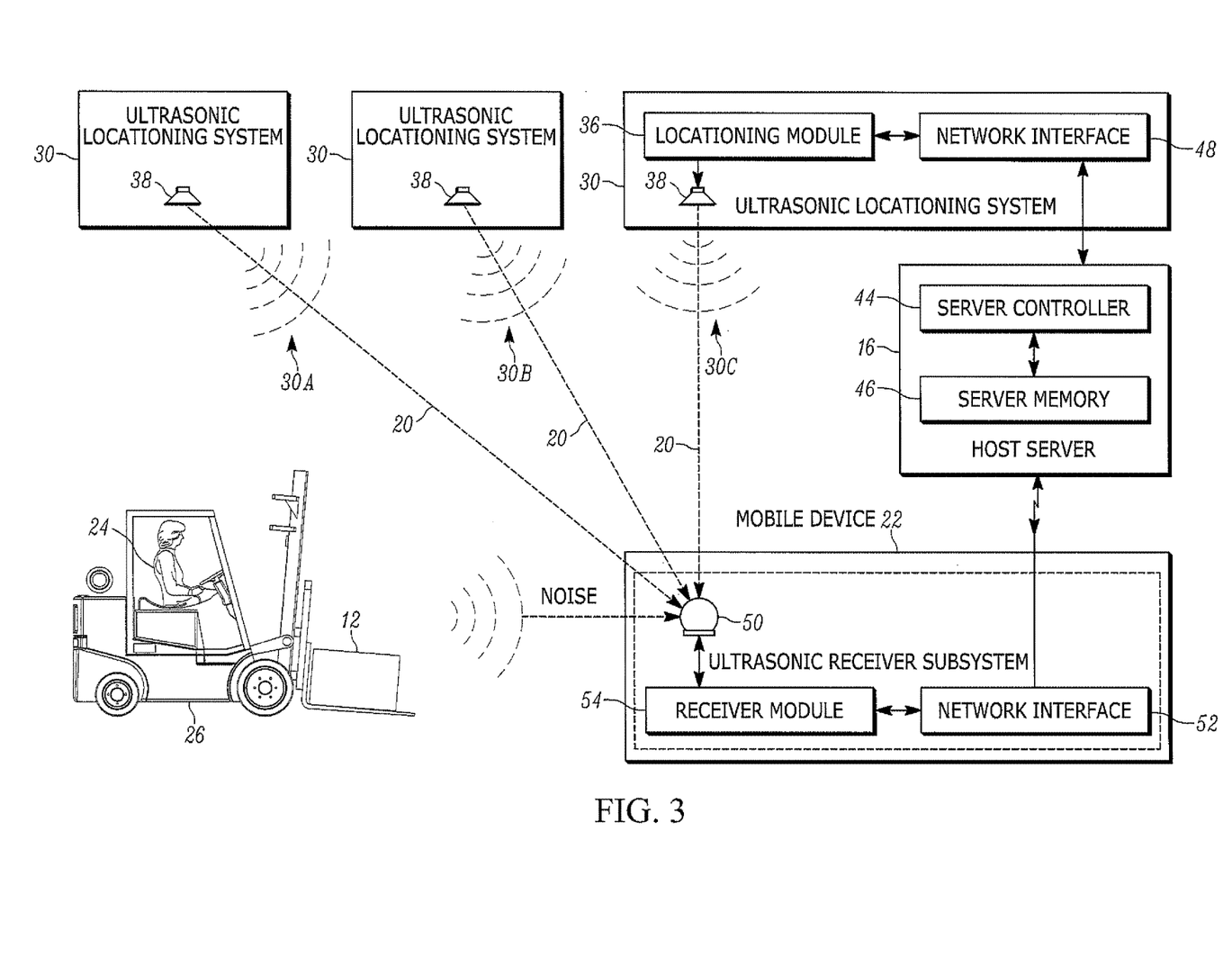
FIG. 3 is a more detailed diagram of the general type shown in FIG. 2, as operated to locate the mobile device by triangulation in the noisy venue in accordance with the present disclosure.

As depicted in FIGS. 1-3, three of the sensing network units 30 can be used, as described below, to locate a handheld, mobile data capture device 22, by triangulation or trilateration, as diagrammatically shown by dashed lines 20. The mobile device 22 is held and operated by, and is jointly movable with, a user 24, e.g., any person, employee, operator, or associate authorized to operate the mobile reader 22. The mobile reader 22 is preferably a radio frequency (RF) identification (RFID) tag reader for reading RFID tags associated with, or attached to, the products 12, or a bar code symbol reader for reading bar code symbols associated with, or attached to, the products 12, or can be any smartphone, tablet, computer, smartwatch, or like portable data capture device.

As best seen in FIG. 2, when the mobile reader 22 is an RFID tag reader, each product 12 is preferably tagged with an RFID product tag, preferably a passive RFID tag for cost reasons, and, in some applications, each RFID product tag may be associated with a pallet or a container for multiple products 12. The venue 10 may have any layout or configuration. As also shown in FIG. 2, the venue 10 may have, for example, a plurality of shelving structures 7 and 8 separated by an aisle 9 in the venue 10, and a plurality of RFID-tagged items 1-2 can be mounted on the shelving structure 7, and a plurality of other RFID-tagged items 3-6 can be mounted on the shelving structure 8.

Figure 4:
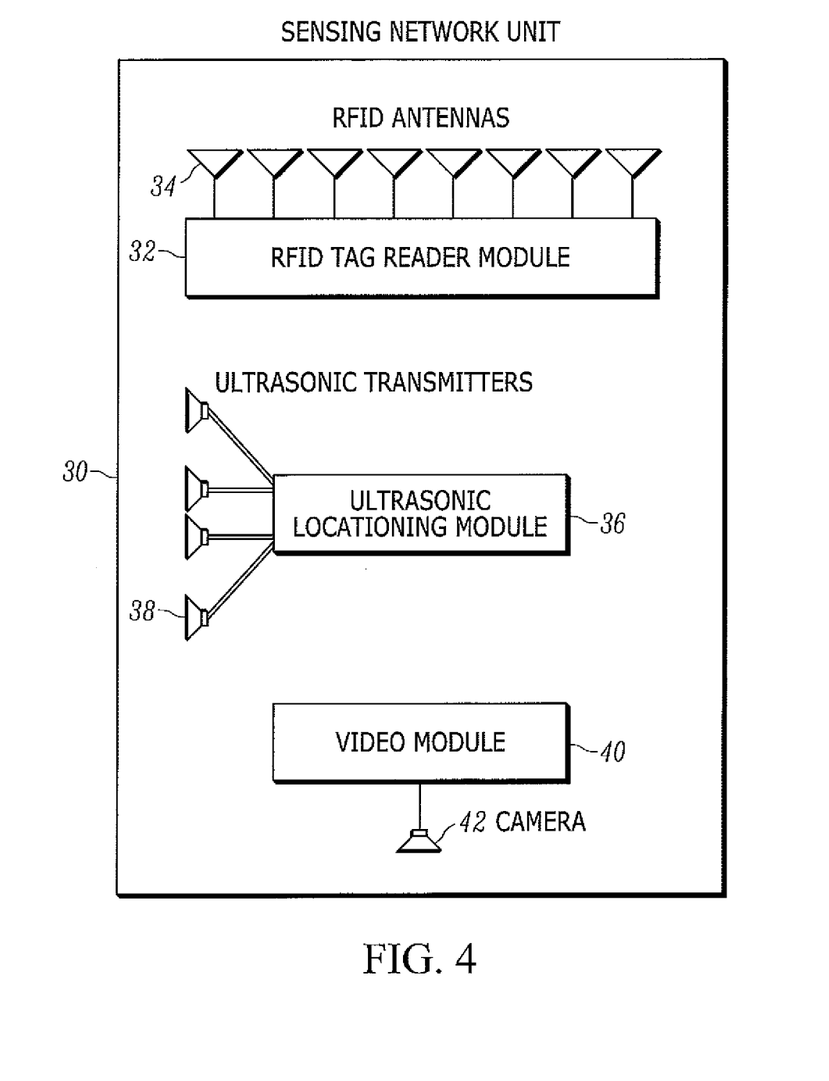
FIG. 4 is a simplified block diagram of various sensing systems that may be mounted in each sensing network unit of FIG. 1.

The block diagram of FIG. 4 depicts different sensing systems that can be mounted in each sensing network unit 30. One or more of these sensing systems can be operated to locate the mobile reader 22 and/or the products 12. For example, one sensing system is an RFID system, which includes an RFID tag reader module 32 having control and processing electronics and an RF transceiver operatively connected to a plurality of RFID antennas 34. The RFID module 32 transmits an RF interrogation signal to the RFID antennas 34, which radiate an antenna field pattern in a read zone in which one or more of the RFID-tagged items 1-6 are contained, thereby interrogating the payloads of the RFID-tagged items 1-6. The RFID-tagged items 1-6 return an RF response signal to the RFID module 32 via the RFID antennas 34. Each payload or captured target data from an RFID-tagged item identifies the RFID-tagged item, and multiple sensing network units 30 locate the RFID-tagged item.

Another sensing system is an ultrasonic locationing system operative for locating the mobile device 22. For example, the ultrasonic locationing system includes an ultrasonic locationing module 36 having control and processing electronics operatively connected to a plurality of ultrasonic transmitters, such as voice coil or piezoelectric speakers 38, for transmitting ultrasonic energy to an ultrasonic receiver or microphone 50 (see FIG. 3) on the mobile device 22. The receipt of the ultrasonic energy at the microphone 50 locates the mobile device 22. Each ultrasonic speaker 38 periodically transmits ultrasonic ranging signals, preferably in short bursts or ultrasonic pulses, which are received by the microphone 50. The microphone 50 determines when the ultrasonic ranging signals are received. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone 50 on the mobile device 22, using a suitable locationing technique, such as triangulation, trilateration, multilateration, etc.

Still another sensing system is a video system operative for locating the mobile device 22, and/or the user 24 operating the mobile device 22, and/or the product 12. The video system includes a video module 40 having camera control and processing electronics that is connected to a camera 42 for capturing an image of the mobile device 22, and/or the user 24, and/or the product 12. The camera 42 is advantageously a high-bandwidth, moving picture expert group (MPEG) compression camera. The capture of the image at the camera 42 is processed by the server 16 to locate the mobile device 22, and/or the user 24, and/or the product 12.

It will be understood that each sensing network unit 30 need not have all or some of the above-described sensing systems, and may include additional sensing systems. In some embodiments, only one sensing system would suffice. In other embodiments, two or more of the sensing systems can cooperate with each other. In a preferred embodiment, the RFID system is employed to sense the general location of an RFID-tagged item, and the ultrasonic locationing system is employed to more accurately locate the RFID-tagged item by locating the mobile device 22 that is being operated to capture data therefrom.

FIG. 3 shows in more detail how a plurality of ultrasonic locationing systems mounted in a corresponding plurality of sensing network units 30 are employed to more accurately locate the mobile device 22 by locating the microphone 50 thereon. Each speaker 38 transmits ultrasonic ranging signals 30A, 30B, 30C, preferably in short bursts or ultrasonic pulses, to the mobile device 22 for reception by the microphone 50. Although only three ultrasonic locationing systems have been illustrated in FIG. 3, it will be understood that many more than three could be, and often are, provided in a particular venue 10.

As also shown in FIG. 3, the host server 16 has a programmed microprocessor or server controller 44 that controls the ultrasonic locationing systems, and a server memory 46 for storing data and programs under the control of the server controller 142. The host server 16 is operatively connected through a network interface 48 to the respective locationing module 36 to generate a transmit drive signal to drive the respective speaker 38 in each sensing network unit 30. The host server 16 is also operatively connected through a network interface 52 to a receiver control and processing module 54 that is connected to the microphone 50, which advantageously already exists on the mobile device 22. The microphone 50 and the receiver module 54 receive and convert each ultrasonic ranging signal 30A, 30B, 30C to an electrical signal that is further processed by the server controller 44 of the host server 16 in order to locate the mobile device 22. As previously described, the flight time difference between the transmit time at which each ranging signal 30A, 30B, 30C is transmitted and the receive time at which each ranging signal 30A, 30B, 30C is received, together with the known speed of each ranging signal 30A, 30B, 30C, as well as with the known locations of the speakers 38, are used, among other factors, to determine the distance to, and, in turn, the position of, the microphone 50 mounted on the mobile device 22, and, in turn, the location of the mobile device 22, as well as the location of the products 12 having data being captured in a read zone of the mobile device 22.

As previously mentioned, a noisy venue 10 can deleteriously affect the operation of the ultrasonic locationing systems. The venue 10 is typically not a quiet environment. Noise can arise from a myriad of sound sources, such as from the users 24 talking on phones or to each other, or from industrial vehicles, such as forklifts 26 (see FIGS. 1 and 3) operative for moving the products 12 from one place to another, etc. The noise can sometimes be so loud as to interfere with the operation of the ultrasonic locationing systems. The ambient noise level can sometimes be so high as to degrade the signal-to-noise ratio of the ultrasonic ranging signals 30A, 30B, 30C. A low signal-to-noise ratio can lead to an erroneous determination of the location of the microphone 50 and of the mobile device 22 that carries the microphone 50 and, in turn, of the products 12 whose data is being captured by the mobile device 22.

In accordance with this invention, in order to mitigate the deleterious effects of a noisy venue 10, a controller, preferably a programmed microprocessor, constituted by the server controller 44, and/or by a controller in the locationing module 36, and/or by a controller in the receiver module 54, is operative not only for controlling the speakers 38 to transmit the ultrasonic ranging signals 30A, 30B, 30C at a sound level, and for controlling the microphone 50 to receive the ultrasonic ranging signals 30A, 30B, 30C, but also for controlling the microphone 50 to also receive acoustic noise signals indicative of noise in the venue 10, for determining a noise level of the acoustic noise signals, and for varying the sound level of the ranging signals 30A, 30B, 30C based on the determined noise level to optimize the determined location of the mobile device 22 and of the products 12 in the noisy venue 10.

Advantageously, the controller increases the sound level of the ranging signals 30A, 30B, 30C when the determined noise level exceeds a noise threshold, and decreases the sound level of the ranging signals 30A, 30B, 30C when the determined noise level is below the noise threshold. The sound level can be varied linearly, or in a stepwise fashion.

Figure 5:
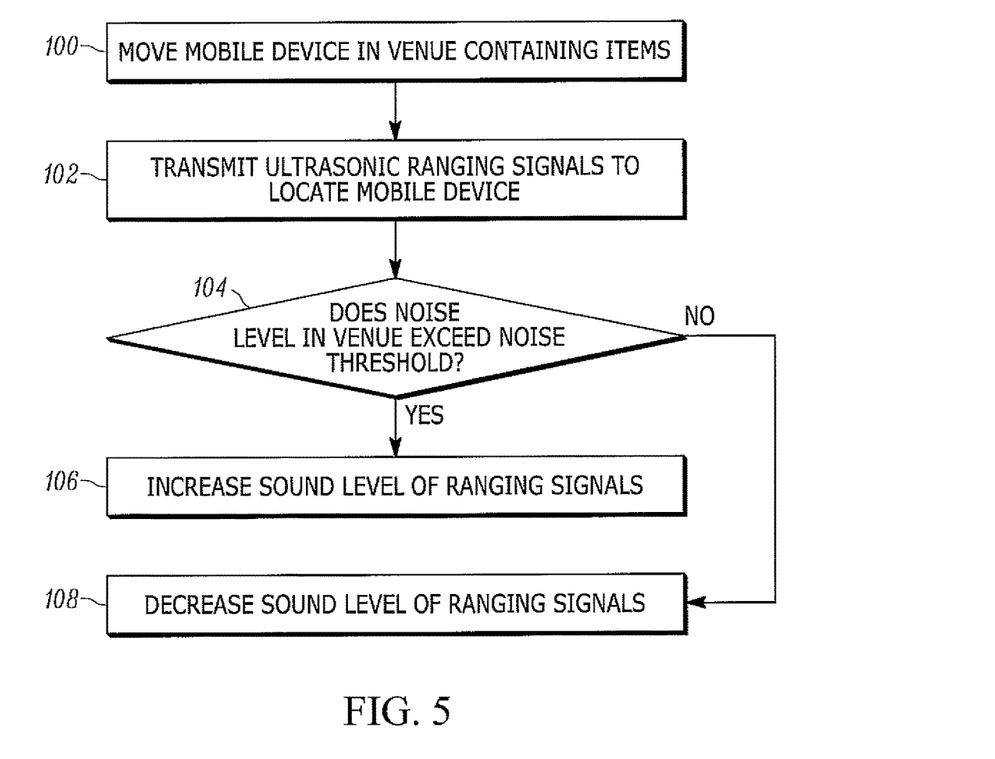
FIG. 5 is a flow chart depicting steps performed in accordance with the method of the present disclosure.

The above-disclosed method is performed, as shown in the flow chart of FIG. 5, by capturing data associated with the products 12 in the venue 10 by operating and moving the mobile device 22 in the venue containing the items or products 12 in step 100, and by transmitting the ultrasonic ranging signals 30A, 30B, 30C to locate the mobile device 22 in step 102. The noise level in the venue is then determined in step 104. If the noise level is too loud and high, then the sound level of the ranging signals 30A, 30B, 30C is increased or boosted in step 106. If the noise level is low, then the sound level of the ranging signals 30A, 30B, 30C is decreased or lowered in step 108.

In the foregoing specification, specific embodiments have been described. However, one of ordinary skill in the art appreciates that various modifications and changes can be made without departing from the scope of the invention as set forth in the claims below. For example, the microphone 50 may be configured as two separate microphones, or a single time-shared microphone. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for locating a mobile device in a venue, the arrangement comprising:
   a plurality of ultrasonic transmitters spaced apart from one another at fixed positions in the venue and operable to transmit ultrasonic ranging signals;
   a receiver disposed in the mobile device wherein the receiver is operable to receive acoustic noise signals indicative of noise in the venue and to receive the ultrasonic ranging signals; and
   a controller operative for controlling the transmitters to transmit the ultrasonic ranging signals at a sound level, and for determining a location of the mobile device based on received ultrasonic ranging signals;
   the controller being further operative for determining a noise level of the acoustic noise signals, and for varying the sound level of the ultrasonic ranging signals based on the determined noise level of the acoustic noise signals.

2. The arrangement of claim 1, wherein the mobile device is one of a handheld radio frequency (RF) identification (RFID) tag reader for reading RFID tags associated with the products, and a handheld bar code symbol reader for reading bar code symbols associated with the products.

3. The arrangement of claim 1, wherein the mobile device is one of a data capture reader, a smartphone, a tablet, a computer, and a smartwatch.

4. The arrangement of claim 1, wherein the transmitters are located overhead in the venue above the mobile device.

5. The arrangement of claim 1, wherein the receiver is a microphone aboard the mobile device.

6. The arrangement of claim 1, wherein the controller is configured to increase the sound level of the ultrasonic ranging signals when the determined noise level of the acoustic noise signals exceeds an acoustic noise threshold, and to decrease the sound level of the ultrasonic ranging signals when the determined noise level of the acoustic noise signals is below the acoustic noise threshold.

7. The arrangement of claim 1, wherein the ultrasonic transmitters periodically transmit the ultrasonic ranging signals, and wherein the receiver periodically receives the acoustic noise signals.

8. The arrangement of claim 1, wherein the ultrasonic transmitters and the receiver are part of an ultrasonic locationing system, and further comprising a host server for controlling the ultrasonic locationing system, and wherein the controller is mounted in at least one of the host server and the ultrasonic locationing system.

9. The arrangement of claim 1, wherein the mobile device is operable for capturing data associated with products positioned in a read zone of the mobile device.

10. A method of locating products in a venue, the method comprising:

controlling ultrasonic transmitters spaced apart from one another at fixed positions in the venue to transmit a plurality of ultrasonic ranging signals at a sound level;

controlling a receiver in a mobile device to receive the ultrasonic ranging signals;

determining a location of the mobile device and of the products in the venue based on the received ultrasonic ranging signals;

controlling the receiver to receive acoustic noise signals indicative of noise in the venue;

determining a noise level of the acoustic noise signals; and varying the sound level of the ultrasonic ranging signals based on the determined noise level of the acoustic noise signals.

11. The method of claim 10, and configuring the mobile device to be one of a handheld radio frequency (RF) identification (RFID) tag reader for reading RFID tags associated with the products, and a handheld bar code symbol reader for reading bar code symbols associated with the products.

12. The method of claim 10, and configuring the mobile device to be one of a data capture reader, a smartphone, a tablet, a computer, and a smartwatch.

13. The method of claim 10, and locating the transmitters overhead in the venue above the mobile device.

14. The method of claim 10, and configuring the receiver as a microphone aboard the mobile device.

15. The method of claim 10, wherein the varying is performed by increasing the sound level of the ultrasonic ranging signals when the determined noise level of the acoustic noise signals exceeds an acoustic noise threshold, and by decreasing the sound level of the ultrasonic ranging signals when the determined noise level of the acoustic noise signals is below the acoustic noise threshold.

16. The method of claim 10, wherein the ultrasonic ranging signals are periodically transmitted, and wherein the acoustic noise signals are periodically received.

17. A sensing unit comprising:

one or more ultrasonic transmitters operable to transmit ultrasonic ranging signals at a sound level;

a communication interface operative for receiving a flight time difference between a transmit time of a ranging signal and a receive time at which the ranging signal was received at a microphone of a mobile device;

the communication interface further operative for receiving a noise level of acoustic noise signals received at the microphone of the mobile device; and a controller operative for varying the sound level of the ultrasonic ranging signals based on a determined noise level of the acoustic noise signals and for determining a location of the mobile device based on the received flight time difference.

18. The sensing unit of claim 17, wherein the mobile device is one of a handheld radio frequency (RF) identification (RFID) tag reader for reading RFID tags associated with the products, and a handheld bar code symbol reader for reading bar code symbols associated with the products.

19. The sensing unit of claim 17, wherein the controller is configured to increase the sound level of the ultrasonic ranging signals when the determined noise level of the acoustic noise signals exceeds an acoustic noise threshold, and to decrease the sound level of the ultrasonic ranging signals when the determined noise level of the acoustic noise signals is below the acoustic noise threshold.

* * * * *